Oct. 28, 1930.  A. B. CHANCE  1,780,003
METHOD OF MANUFACTURING SPLIT RINGS
Filed April 12, 1928    2 Sheets-Sheet 1

Inventor
Albert B. Chance
By
Williams, Bradbury, McCabe & Hinkle
Attys

Oct. 28, 1930.  A. B. CHANCE  1,780,003
METHOD OF MANUFACTURING SPLIT RINGS
Filed April 12, 1928   2 Sheets-Sheet 2

Inventor
Albert B. Chance
By
Williams, Bradbury & Cabbs Hun Attys.

Patented Oct. 28, 1930

1,780,003

UNITED STATES PATENT OFFICE

ALBERT B. CHANCE, OF CENTRALIA, MISSOURI

METHOD OF MANUFACTURING SPLIT RINGS

Application filed April 12, 1928. Serial No. 269,393.

The present invention relates to a method of manufacturing split rings, and is more particularly concerned with the manufacture of machined metal rings such as are employed for piston rings or the like.

Both of the present methods of manufacture of piston rings possess inherent difficulties which impose the use of complicated machinery and which result in the manufacture of a non-uniform product.

According to one method of manufacture, the metal rings are cast in slightly oblong form in order to provide sufficient metal circumferentially of the ring so that the ring will be circular when the metal at the slit is removed, and to give the ring a natural bias to an enlarged size.

The ring is then cut or split on one of its longest curves and sufficient metal is removed at the split so that when contracted, the ring is substantially circular. In order to machine the sides and outer surfaces of the split ring, it is necessary to provide a complicated mechanism to hold the ring in contracted circular form and the machining of such split rings naturally consumes more time than would be required if the ring were perfectly circular without loose ends.

According to another method of manufacture, the oblong rings of metal are first machined in oblong form and then split, but as the rings are non-circular, any machining device which trims and smooths the rings by rotation (as a lathe or similar machines) does not form rings of uniform thickness, because the parts of the ring are located at different radii from the axis of the ring.

One of the objects of the present invention is the elimination of the foregoing difficulties by the provision of a novel method of manufacture of split rings and novel apparatus for carrying out the method.

Another object of the invention is the provision of a more simple method of manufacture whereby split rings of more uniform quality and size may be manufactured more economically and more quickly.

Other objects and advantages of the invention will appear more fully from the following description and from the accompanying drawings, in which similar characters of reference indicate similar parts throughout the several views.

Referring to the two sheets of drawings.

Figure 2:
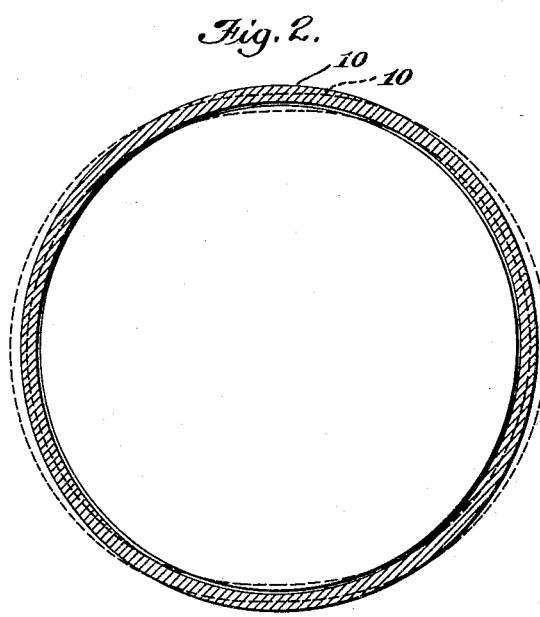
Fig. 2 is a sectional view of the cast metal ring before it is machined.
Figure 3:
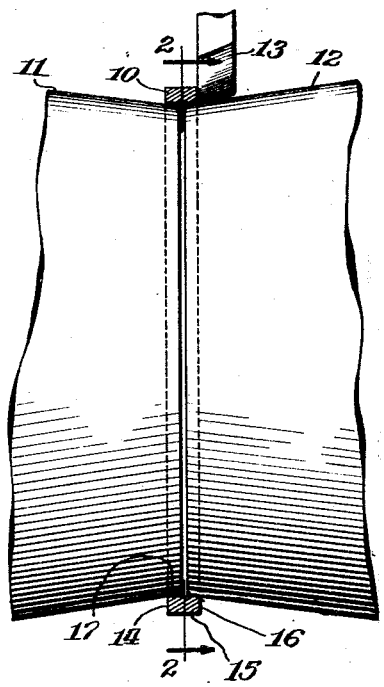
Fig. 3 is a diagrammatic view of the ring during the machining or finishing operation, showing a transverse cross section of the ring.
Figure 1:
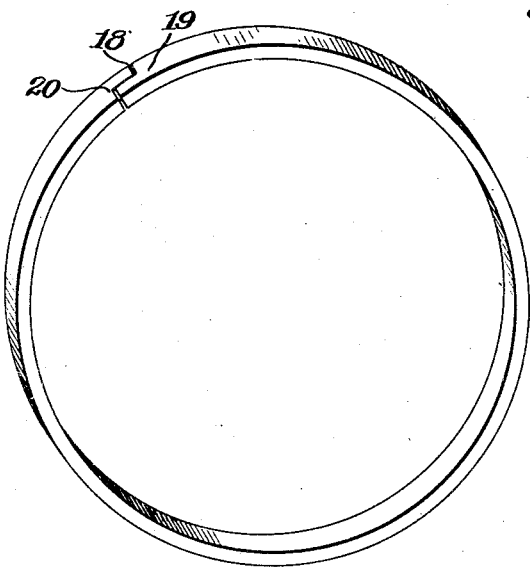
Fig. 1 is a view in perspective of a piston ring manufactured according to the present method.

Referring to Figs. 1 to 3, the first step in the manufacture of the split metal rings consists in casting the rings in slightly oblong form and slightly larger than the desired finished ring. The cast metal rings 10 may be of substantially the shape shown in the dotted lines in Fig. 2.

In order to machine these rings quickly and accurately, I prefer to provide a holding device having a pair of movable cones 11 and 12 of such size and slope that they may be forced into the rings 10, springing the rings to substantially circular form as shown in Fig. 3 and in the full lines of Fig. 2. As the cast metal rings only need to be oblong a slight amount, this may be accomplished by means of a pair of frustro-conical members 11 and 12 wedged into the ring 10 from each side, and the ring 10 will thus be effectively held in circular form to be acted upon by a cutter 13.

The rings 10 are then trimmed or finished on all the sides except the inside of the ring; that is to say, at 14, 15 and 16, while the interior 17 of the ring is left with the tough skin which is formed by casting on the interior surface of the ring.

After the ring 10 has been finished in this manner, it may be split or severed at a point 18 in one of the longest curved sides, and I desire it to be understood that the split may be oblique, straight, provided with an offset as shown, or any other convenient form.

Sufficient metal is removed at the split 18 so that when the ends 19 and 20 are compressed together, the ring assumes a substantially circular form.

Figure 5:
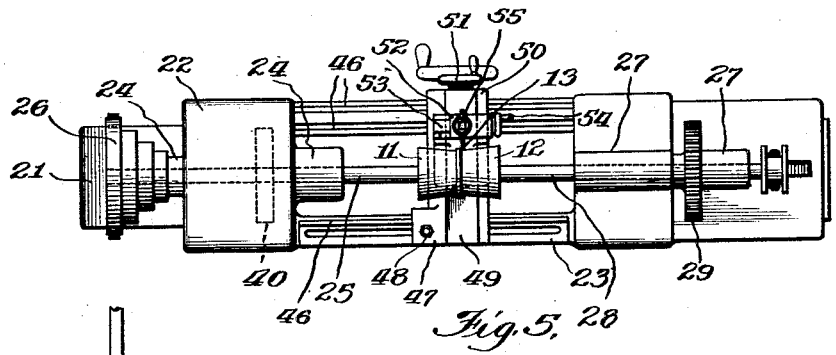
Fig. 5 is a plan view of the same apparatus.
Figure 4:
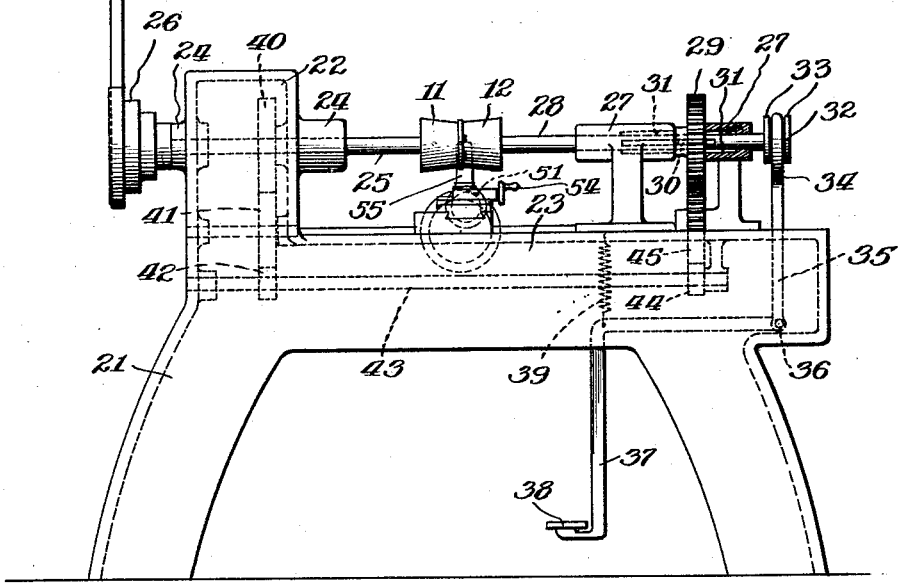
Fig. 4 is a side elevational view of one form of apparatus for carrying out the present method of manufacturing.

Referring to Figs. 4 and 5, I have here shown in diagrammatic form, a simple apparatus for quickly and economically carrying out the steps of the foregoing method of manufacture.

The apparatus may consist of a simplified lathe having a supporting framework 21 provided with an upwardly projecting head 22 and a bed 23. The head may be provided with bearings 24 for rotatably supporting a shaft 25 axially supporting the frustro-conical member 11 and the shaft 25 may be provided with a multi-speed pulley 26 for driving the member 11.

The bed of the lathe may also support a pair of bearings 27 in axial alignment with the bearings 24 and the bearings 27 may rotatably support a second shaft 28 for axially supporting the second frustro-conical member 12. The shaft 28 may be provided with a spur gear 29 mounted between the bearings 27 and provided with a key and keyway 30 for causing the gear 29 to rotate with the shaft 28, but permitting the shaft 28 to slide within said gear. The bearings 27 may also be provided with counter-bores 31 for permitting rotation of the keyed shaft 28 as well as reciprocation.

Carried by the outer end of the shaft 28 is a substantially spool-shaped member 32 having shoulders 33 on each side of a bifurcated member 34 carried by a bell crank 35. The bell crank 35 is pivotally supported upon the frame 31 as at 36 and is provided with a downwardly extending arm 37 carrying a foot pedal 38. A spring 39 having one end secured to the bell crank 35 and the other end to the frame 21, biases the bell crank 35 in a clockwise direction.

In order to provide means for driving both frustro-conical members 11 and 12 at the same rate of speed, the shaft 24 may carry a spur gear 40 within the head 22, the spur gear meshing with a second gear 41 which meshes with a pinion 42 carried by a drive shaft 43 rotatably supported below the bed 23.

The drive shaft 43 also carries a second pinion 44 at its opposite end aligned with the gear 29 and the pinion 44 meshes with a second gear 45 which meshes with the gear 29. The pairs of gears 29 and 40, 41 and 45, 42 and 44, should be of the same size in order to drive both the frustro-conical members 11 and 12 at the same speed.

The bed 23 of the lathe may be provided with a pair of guides 46 for slidably supporting a carriage 47 which may be clamped in any adjusted position by one or more bolts 48. The carriage 47 may be provided with a guide 49 for slidably supporting a second carriage 50 which may be reciprocated transversely to the axis of the lathe by a hand wheel 51. The carriage 50 may also support a third carriage 52 upon a guide 53 and the third carriage may be reciprocated in the direction of the axis of the lathe by a hand wheel 54 for providing a fine adjustment. The carriage 52 fixedly supports a tool post 55 for supporting a cutter 13. It is of course understood that any type of cutting tool may be used, such as those employed upon an ordinary lathe.

It will thus be observed that an oblong cast metal ring may be held between the frustro-conical members 11 and 12 whereupon the operator may step upon the foot pedal 38 rotating the bell crank 35 counterclockwise and sliding the shaft 28 to the left. The frustro-conical members 11 and 12 will then approach each other and their smallest bases being less than the size of the cast ring, these members will enter the cast ring and wedge it apart to the position shown in Fig. 3, when the ring will be substantially circular. The sides 14, 15 and 16 of the ring may then be machined by the cutting tool 13 and the ring may be quickly released by lifting the foot from the foot pedal 38.

When the foot is lifted from the foot pedal, the spring 39 will draw the foot pedal upward, rotating the bell crank 35 in a clockwise direction and sliding the shaft 28 to the right, to separate the frustro-conical members 11 and 12.

It will thus be observed that I have invented a novel method of manufacture of split rings, whereby the rings may be accurately machined while held in circular form before they are split. As the rings are not yet split at this time, an extremely simple holding device consisting of two frustro-conical members may be employed, and the rings are gripped and released by the mere pressure of the foot upon a foot pedal. According to the present method of manufacture, such split metal rings may be made more economically and more quickly than has been possible with the methods and machines of the prior art.

While I have illustrated and described a preferred series of steps for my method of manufacture and a specific embodiment of the apparatus for carrying out the method, I do not wish to be limited to the precise details set forth, but desire to avail myself of all changes within the scope of the appended claims.

Having thus described my invention, what I claim is new and desire to secure by Letters Patent of the United States, is:

1. The method of manufacturing non-circular resilient rings, which comprises forcing both sides of said ring to substantially circular form, and finishing said ring while in circular form.

2. The method of manufacturing non-circular resilient rings, which comprises forcing both sides of said ring to substantially circular form, finishing said ring while in circular form and severing said ring.

In witness whereof, I hereunto subscribe my name this 9th day of April, 1928.

ALBERT B. CHANCE.